Jan. 16, 1962  E. E. SOULIER  3,016,564
FISH SCALING DEVICE
Filed Aug. 8, 1960
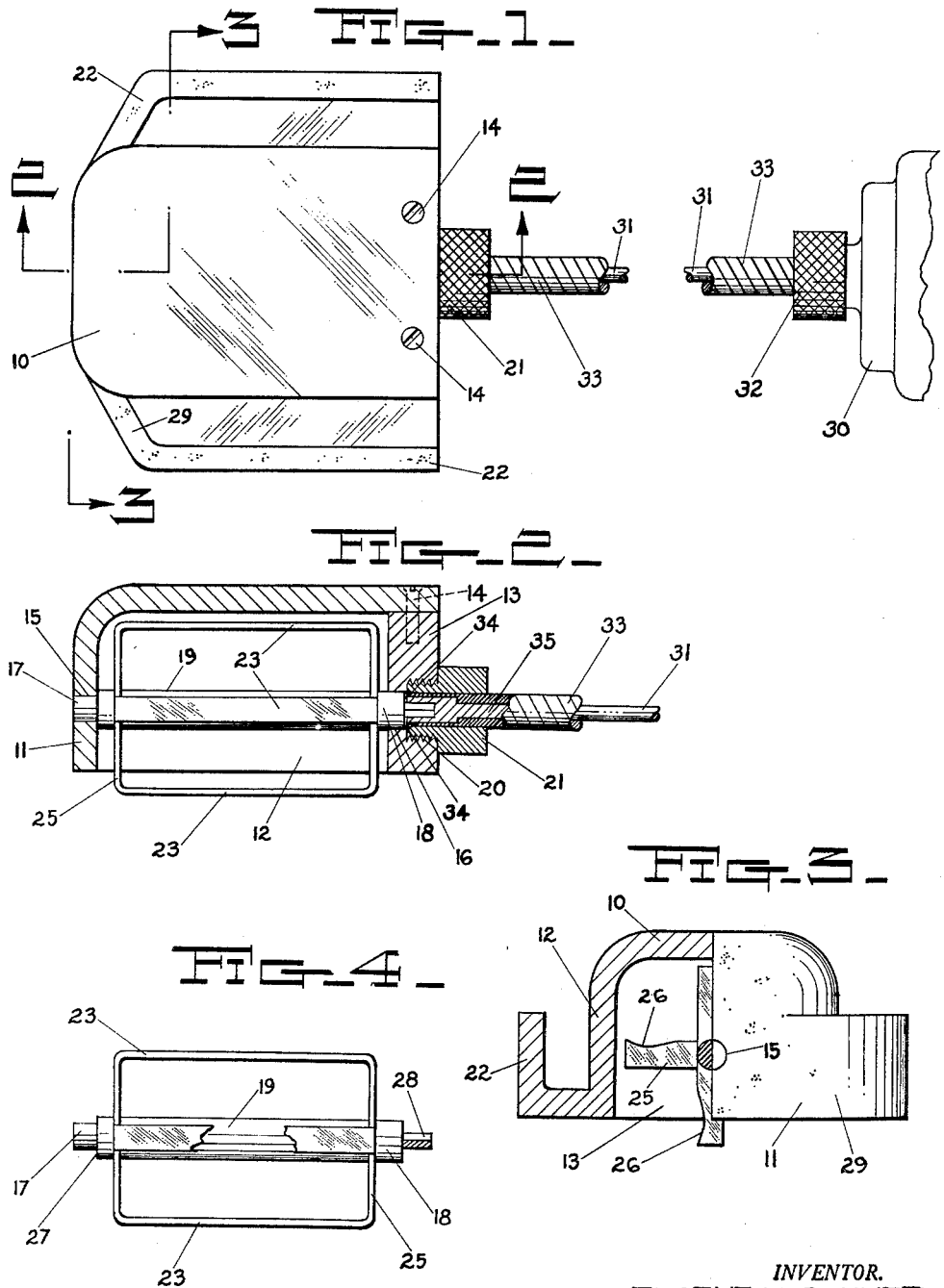
INVENTOR.
EUGENE E. SOULIER

United States Patent Office 3,016,564
Patented Jan. 16, 1962

3,016,564
FISH SCALING DEVICE
Eugene E. Soulier, P.O. Box 233, Broussard, La.
Filed Aug. 8, 1960, Ser. No. 47,979
1 Claim. (Cl. 17—5)

This invention relates to devices for removing scales from fish, and particularly to a device which enables an improved and more rapid descaling operation.

The removal of fish scale is considered a skilled operation and can become exceedingly tiresome on the hands and wrists. Many hand tools have been developed with a view to simplifying the operation, but all known methods involve considerable manual effort. There is a need in the industry for a more efficient means which will accelerate and simplify this operation.

It is therefore a primary object of this invention to provide a fish scaling device which is power operated and manipulated with one hand.

It is a further object of this invention to provide a fish scaling device which is provided with a shield to protect the user from flying fish scale and finger guards to protect the fingers from the rotating blades.

It is yet a further object of this invention to provide a fish scaling device which is of simple rugged construction and adapted for both commercial and domestic use.

The invention consists of a housing surrounded by opposed side walls and end walls and open on the underside. A shaft is mounted for rotation between the end walls, and blades supported by the shaft and parallel thereto rotate freely within the housing to project beneath the underside. A flexible drive is releasably secured to one end of the shaft and is connected at the other end to a power source. Finger guards extend outwardly from the lower edges of the side walls and blend into one of the end walls.

Further objects and advantages of this invention will become apparent from the following more detailed description of a preferred embodiment thereof, taken in conjunction with the attached drawings wherein:

FIG. 1 is a plan view of the device with depending flexible drive and power source.

FIG. 2 is a cross sectional side elevation of the device taken along the line 2—2 of FIG. 1.

FIG. 3 is an end elevation shown partly in cross section and taken along the line 3—3 of FIG. 1.

FIG. 4 is a view of the rotor and depending descaling blades which rotate within the housing of the device.

Similar reference characters indicate corresponding parts throughout the several views in the drawing.

Referring now to the drawing in detail, the numeral 10 represents a housing having a vertical end wall 11 and opposed parallel side walls 12. The side walls 12 and end wall 11 are formed as a unitary structure to complete the housing and blend together in suitably rounded edges. The opposite end of the housing is closed by a removable wall 13 which embraces the side walls 12 and is secured by countersunk screws 14 engaging through the top of the housing 10. Extending outwardly from the lower edge of each side wall 12 is an L shaped finger channel 22 adapted to protect the fingers and thumb from the rotating cutter blades 23. The channel connects with the vertical end wall 11 by means of an upstanding front wall 29.

Formed through the two end walls 11 and 13 are two aligned bearing holes 15 and 16 adapted to rotatively receive opposite ends 17 and 18 of a cutter shaft 19. The bearing hole 16 formed in the removable wall 13 is counterbored on the outer side at 20 and is suitably threaded to receive a knurled flexible drive coupling 21.

The cutter shaft 19 is provided with four diametrically opposed cutter blades 23 which are secured parallel to the axis of the shaft by radial supports 25 depending from each end. The supports and blade edge are given a slight negative rake as at 26, but the edge remains essentially blunt. The end 17 of the shaft 19 is formed with a smaller diameter than that of the shaft so as to present a thrust bearing surface 27 in engagement with the inner side of the end wall 11. The opposite end 18 of the shaft is milled to form a male plug 28 having a square cross section. The shaft is mounted so that the blades revolve freely within the housing 10 and project outwardly of the bottom.

A driving source such as an electric motor 30 connects with a flexible drive 31 by means of a coupling 32. The drive 31 is covered with armoured cable 33 which is flared outwardly at 34 to engage with the forward end of the coupling 21. The end of the drive 31 is provided with a recessed head 35 adapted to releasably engage over the male plug 28 of the shaft 19.

In operation, the fish to be cleaned is held by the tail in the left hand and the device is grasped by the housing in the right hand. The power drive operates to revolve in an anticlockwise direction to engage the fish surface on the operator side of the housing. The device is then moved longitudinally of the fish in unidirectional strokes. It will be appreciated that for left handed operators, it is necessary to reverse the direction of the drive to enable a left handed operation.

Having described the invention in a preferred form, it will be appreciated that some modifications may be made to the precise configuration, without departing from the scope or spirit of the invention, as defined by the following claim.

I claim:

A power operated fish scaling device comprising, a housing having opposed side walls and a fixed end wall, outwardly extending finger channels projecting from the lower edge of the side walls to provide protection for the fingers and thumb whilst holding and operating the device, a removable end wall disposed opposite the fixed end wall, a shaft rotatably mounted between the end walls, blades supported by diametrically opposed arms projecting from the opposite ends of the shaft, said blades being symmetrically oriented about the shaft and extending beneath the housing upon rotation, and flexible drive means for rotating the shaft.

References Cited in the file of this patent

UNITED STATES PATENTS

| 267,491 | Carley | Nov. 14, 1882 |
| 1,758,675 | Reilly | May 13, 1930 |
| 2,557,272 | Gabriel | June 19, 1951 |
| 2,720,002 | Waters | Oct. 11, 1955 |